United States Patent [19]

Benkmann

[11] Patent Number: 4,834,780

[45] Date of Patent: May 30, 1989

[54] SIX ADSORBER PRESSURE SWING ADSORPTION PROCESS

[75] Inventor: Christian Benkmann, Graefelfing, Fed. Rep. of Germany

[73] Assignee: Linde Aktiengesellschaft, Wiesbaden, Fed. Rep. of Germany

[21] Appl. No.: 683,089

[22] Filed: Dec. 18, 1984

[30] Foreign Application Priority Data

Dec. 20, 1983 [DE] Fed. Rep. of Germany ....... 3346032

[51] Int. Cl.⁴ ............................................. B01D 53/04
[52] U.S. Cl. .......................................... 55/26; 55/62; 55/68; 55/75
[58] Field of Search .................... 55/25, 26, 58, 62, 68, 55/74, 75, 179, 180, 387, 389

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/62 X |
| 3,636,679 | 1/1972 | Batta | 55/62 X |
| 3,703,068 | 11/1972 | Wagner | 55/62 X |
| 4,077,779 | 3/1978 | Sircar et al. | 55/62 X |
| 4,299,595 | 11/1981 | Benkmann et al. | 55/25 X |
| 4,340,398 | 7/1982 | Doshi et al. | 55/62 X |
| 4,381,189 | 4/1983 | Fuderer | 55/62 X |
| 4,461,630 | 7/1984 | Cassidy et al. | 55/62 X |
| 4,468,237 | 8/1984 | Fuderer | 55/62 X |

FOREIGN PATENT DOCUMENTS

| | | |
|---|---|---|
| 2624346 | 12/1977 | Fed. Rep. of Germany .......... 55/25 |
| 2851847 | 6/1980 | Fed. Rep. of Germany . |
| 3006836 | 9/1981 | Fed. Rep. of Germany . |

*Primary Examiner*—Robert Spitzer
*Attorney, Agent, or Firm*—Millen & White

[57] ABSTRACT

A pressure swing adsorption process with six adsorbers is operated with only one adsorber in an adsorption phase. The adsorbers pass through switching cycles wherein, following an adsorption phase, there are conducted four- or five-stage cocurrent expansions, then a countercurrent expansion, a scavenging with cocurrent expansion gas, and a multistage pressurizing to the adsorption pressure. In this process, three or four pressure equalization stages are provided.

22 Claims, 2 Drawing Sheets

| 1 | ADS | | E1 | E2 | E3 | E4 | E5 | S | B3 | B2 | B1 | B0 |
|---|---|---|---|---|---|---|---|---|---|---|---|---|
| 2 | B1 | B0 | ADS | | E1 | E2 | E3 | E4 | E5 | S | B3 | B2 |
| 3 | B3 | B2 | B1 | B0 | ADS | | E1 | E2 | E3 | E4 | E5 | S |
| 4 | E5 | S | B1 | B2 | B2 | B0 | ADS | | E1 | E2 | E3 | E4 |
| 5 | E3 | E4 | E5 | S | B3 | B2 | B1 | B0 | ADS | | E1 | E2 |
| 6 | E1 | E2 | E3 | E4 | E5 | S | B3 | B2 | B1 | B0 | ADS | |

Fig.2

| 1 | ADS | | E1 | E2 | E3 | E4/1 | 2 | E5 | S | B4 | B3 | B2 | B1 | B0 |
|---|---|---|---|---|---|---|---|---|---|---|---|---|---|---|
| 2 | B1 | B0 | ADS | | E1 | E2 | E3 | E4/1 | 2 | E5 | S | B4 | B3 | B2 |
| 3 | B3 | B2 | B1 | B0 | ADS | | E1 | E2 | E3 | E4/1 | 2 | E5 | S | B4 |
| 4 | E5 | S | B4 | B3 | B2 | B1 | B0 | ADS | | E1 | E2 | E3 | E4/1 | 2 |
| 5 | E3 | E4/1 | 2 | E5 | S | B4 | B3 | B2 | B1 | B0 | ADS | | E1 | E2 |
| 6 | E1 | E2 | E3 | E4/1 | 2 | E5 | S | B4 | B3 | B2 | B1 | B0 | ADS | |

Fig.3

SIX ADSORBER PRESSURE SWING ADSORPTION PROCESS

BACKGROUND OF THE INVENTION

This invention rlates to a cyclical pressure swing adsorption process for the purification or fractionation of a gaseous stream using six alternating adsorbers. For the sake of simplicity, when "purification" and the like are set forth hereinafter, these terms are intended to include fractionation and the like as well. Accordingly, this invention is applicable to processes wherein the desired products may be either adsorbed or unadsorbed, but to avoid confusion, the product gas herein refers to the unadsorbed gas.

In particular, the invention is directed to a six adsorber system wherein the gaseous stream during an adsorption phaase at the highest process pressure is conducted through an adsorber and purified gas is withdrawn from the outlet end of the adsorber, the adsorber being subjected after termination of the adsorption phase, to a multistage cocurrent expansion with the resultant expansion gases being utilized, in part, for pressure buildup of other, previously scavenged adsorbers and, in part, for scavenging another adsorber which is at the lowest process pressure. The cocurrently expanded adsorber is then subjected to a countercurrent expansion at the lowest process pressure and the adsorber is scavenged with cocurrent expansion gas from another adsorber. The adsorber is then subjected to multistage pressurizing to the adsorption pressure with cocurrent expansion gas and purified product gas.

A process of this type is described in DOS No. 2,851,847. The process scheme illustrated in FIG. 5 thereof relates to an installation with six adsorbers, the adsorption phases of respectively three adsorbers overlapping with one another with respect to time. Cocurrent expansion occurs in two stages, wherein in a first phase, pressure equalization takes place with another adsorber passing through a pressure buildup phase, and in a second phase, scavenging gas is obtained for use in another adsorber, the latter is being scavenged at that time. After the subsequent countercurrent expansion and scavenging steps, a two-stage pressure buildup occurs, first with expansion gas from an adsorber which is in a cocurrent expansion phase at that time and finally with product gas.

Furthermore, DOS No. 2,624,346 discloses a pressure swing adsorption process with nine adsorbers wherein it is likewise important to operate at least three adsorbers simultaneously in adsorption. In this method, within one cycle, four cocurrent expansion stages are provided for each adsorber, three of these stages being carried out in pressure equalization with adsorbers to be pressurized. Finally, there are a number of pressure swing adsorption processes operated with the use of two to a maximum of five adsorbers, with the common feature that only one adsorber at a time passes through an adsorption phase. This is necessary in processes of this type since otherwise the remaining basic process steps canot be performed. For examples of such processes, attention is invited to U.S. Pat. Nos. 3,430,418 and 3,564,816.

Therefore, the known state of the art generally offers the teaching that, with the use of more than five adsorbers, several adsorbers simultaneously are operated in an adsorption phase. This is also expressly set forth in German Pat. No. 3,006,836. The parallel adsorption in several adsorbers was considered to be especially desirable with a view toward the constant quantity of the product gas as well as of the residual gas stream, i.e., the countercurrent expansion gas, as well as the scavenging gas loaded with desorbed components.

SUMMARY

An object of one aspect of this invention is to provide a process of the type discussed above such that there is not only a yield of a substantially constant and uniform gas quantity, but also a process that is advantageous from an energy viewpoint.

Upon further study of the specification and appended claims, further objects and advantages of this invention will become apparent to those skilled in the art.

To attain these objects, a process is provided wherein only one adsorber at a time is in the adsorption phase, and wherein four or five cocurrent expansion phases are utilized, one of which yields scavenging gas for another adsorber and the remaining expansion gases being conducted in pressure equalization with the other adsorbers to be pressured.

In an intentional avoidance of conventional operation, the process of this invention does not involve the operation of several adsorbers simultaneously in an adsorption phase. Instead, by employing only one adsorber in an adsorption phase, it is possible to increase the number of pressure equalization stages by two or even three stages as compared with a conventional six-adsorber method. The advantage attainable thereby is particularly in that the product gas, i.e., the gas tht is not adsorbed, can be obtained in a higher yield inasmuch as the loss of product components in the residual gas is diminished with an increasing number of pressure equalization stages. Besides, by raising the number of pressure equalization stages, the pressure level of the expansion gases is utilized more efficiently.

It has been found, unexpectedly, that when operating a six-adsorber installation with only one adsorber in adsorption, no difficulties occur with regard to the amount of product gas and of residual gas but that, rather, the constancy of these streams can be ensured by relatively simple modifications. For example, in order to discharge a constant product quantity when the final phase of repressurizing an adsorber with product gas is shorter than the adsorption phase, i.e., when product gas for this pressurizing step must be branched off only during a portion of the adsorption phase, it is possible to provide a buffer tank for the product gas. In the alternative—and this is normally more advantageous since it is feasible with additional costs—it is possible to conduct a portion of the product gas during a preceding pressure buildup stage, together with cocurrent expansion gas from another adsorber, into a further adsorber that is at this time in a pressure buildup phase by virtue of pressure equalization. Best suited for this purpose is an adsorber passing at this time through the final pressurizing phase taking place by pressure equalization since the additionally introduced product gas then suffers the least pressure loss. In addition, the introduction of product gas via the outlet end of the adsorber to be pressurized ensures the complete absence of adsorbable components in the adsorber outlet end, which is very important to the operation as a whole. Such components, which may be still present in the adsorber to be pressurized are then effectively pushed back toward the inlet end of this adsorber. In this manner of operation, it can also be advantageous to make the final pressure buildup phase, performed in pressure equalization, relatively brief, and to make the pressure buildup phase to be subsequently performed with product gas relatively long, e.g., so that the final pressure equalization time is about 10 to 100, especially 20 to 30% of the final repressurization time.

In one embodiment of the invention, there are provided four cocurrent expansion phases. To obtain a high product yield and efficient usage of the pressure potential, it is advantageous in this connection to conduct the first three cocurrent expansion phases in pressure equalization with other adsorbers to be pressurized and to take the cocurrent expansion gas, required for scavenging a further adsorber, from the fourth cocurrent expansion phase.

On the other hand, in a second embodiment of the invention with five cocurrent expansion phases, it proved to be advantageous to employ the expansion gas from the first, third and the fifth cocurrent expansion gas. The gas obtained in the fifth cocurrent expansion phase is preferably utilized herein for the first pressure buildup phase of an adsorber that has been scavenged immediately preceding this phase.

The process of this invention can be utilized in a large number of gas separation processes, for example for air fractionation, the production of noble gases, the purification of natural gas, and especially for the purification of synthesis gases to obtain a hydrogen stream. The adsorption can be effected in each case with the selection of an arbitrary adsorbent suitable for the respective separation process, for example activated carbon, silica gel, alumina gel, or molecular sieves. The quantity of the gaseous streams to be processed in the method of this invention is limited only by practical conventional engineering considerations relevant to adsorber size, gas being adsorbed, etc. Thus, for example, the process of this invention, is especially suitable for the production of pure hydrogen from gaseous streams having a flow rate of about 2,000 and 50,000 $Nm^3/h$. Conversely, when purifying helium, the process can be beneficially utilized even when the gas flow is only about 50 $Nm^3/h$.

BRIEF DESCRIPTION OF THE DRAWINGS

FIGS. 2 and 3 are each cycle schedules for performing the process in a facility according to FIG. 1.

DETAILED DESCRIPTION OF THE DRAWINGS

Figure 1:
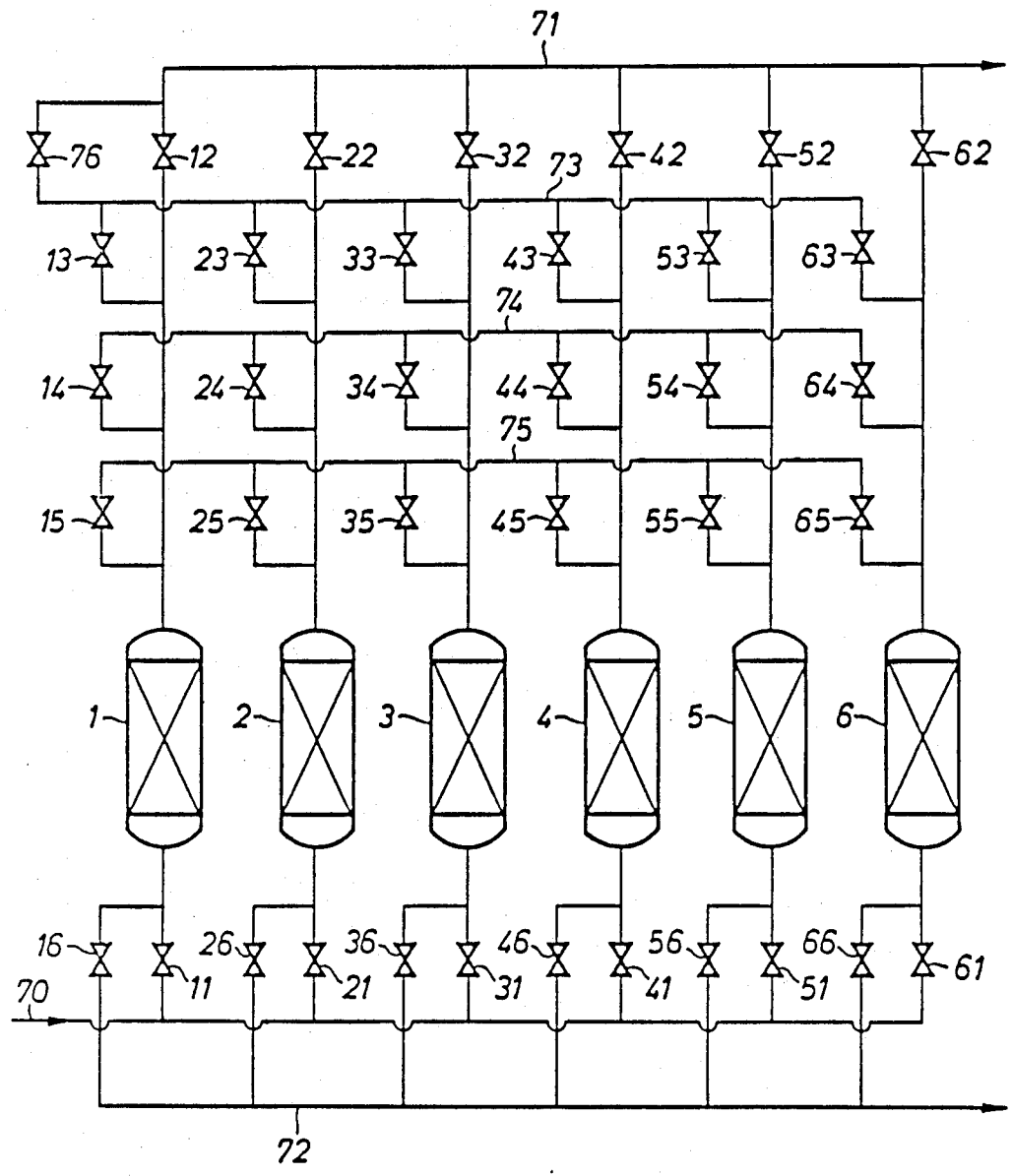
FIG. 1 is a schematic flowsheet of a preferred facility for conducting the invention.

In the installation shown in FIG. 1, the six adsorbers are denoted by numerals 1 through 6. The adsorber 1 is associated on the raw gas inlet side with valves 11 and 16 as well as on the product gas outlet side with valves 12, 13, 14 and 15. Correspondingly, adsorbers 2–6 are associated with valves 21–26 to 61–66. The installation contains a raw gas feed conduit 70 which can be connected via valves 11–61 to the adsorbers 1–6, as well as a product gas conduit 71 which can be connected via valves 12–62 to the outlet ends of adsorbers 1–6. Furthermore, a residual gas conduit 72 is included which can be connected via valves 16–66 to the inlet ends of adsorbers 1–6, and finally, conduits 73, 74 and 75 are provided which can be connected via valves 13–63, 14–64 and 15–65, respectively, to the outlet ends of adsorbers 1–6. Conduits 73 and 74 are pressure equalization conduits whereas 75 is a scavenging gas conduit. If the process is conducted with four pressure equalization stages, then pressure equalization is additionally also performed via conduit 75. Conduit 73 is in communication with the product gas conduit 71 by way of valve 76.

The processes taking place in the individual adsorbers in succession during a complete switching cycle will be described with reference to adsorber 1, it being assumed, firstly that three pressure equalization stages are employed in accordance with the cycle should illustrated in FIG. 2. The parenthetical expressions added, ADS, E1 to E5, S, B0 to B3, refer to FIG. 2.

The raw gas to be purified passed via conduit 70 and the opened valve 11 into adsorber 1. The more readily adsorbable components are retained in adsorber 1 whereas unadsorbed components are discharged and passed into the product gas conduit 71 via the opening valve 12. The adsorption phase (ADS) is continued until a desired loaded condition of adsorber 1 has been attained, whereupon the valves 11 and 12 are closed and the valves 21 and 22 are opened so that the adsorption can be continued in adsorber 2 with continuous discharging of product via conduit 71. The pressure in adsorber 1 is now lowered to a first intermediate pressure (E1). This takes place by pressure equalization with adsorber 3 via conduit 73 and the opened valves 13 and 33. Adsorber 3 passes, during this phase, through its third equalizing—pressurizing phase B1. After pressure equalization has taken place, valve 13 is closed and valves 14 and 44 are opened so that adsorber 1 transfers, via conduit 74, additional cocurrent expansion gas into adsorber 4 which presently runs through its second pressure buildup phase (B2). After termination of this pressure equalization, valve 44 is closed and valve 54 is opened so that additional cocurrent expansion gas is withdrawn from adsorber 1 via conduit 74 and is now conducted into adsorber 5. Adsorber 5 is passing through its first pressure buildup stage B3. After termination of this third pressure equalization, valve 14 is closed and a final cocurrent expansion gas is discharged into conduit 75 via the now opened valve 15.

This final cocurrent expansion gas is conducted as scavenging gas via the opened valve 65 through adsorber 6 and, after loading with desorber components, passed via valve 66 into the residual gas conduit 72. After the scavenging phase is finished, valve 15 is closed and adsorber 1 is expanded, by opening valve 16, countercurrently to the adsorption direction to the minimum process pressure (E5). Subsequently, scavenging (S) of adsorber 1 takes place with expansion gas from adsorber 2 which latter is just passing through its fourth cocurrent expansion phase (E4), for which purpose valves 15 and 25 are opened. The scavenging gas loaded with desorbed components is discharged into residual gas conduit 72 via the opened valve 16. After scavenging has taken place, adsorber 1 must again be pressurized to adsorption pressure. This is done first of all by an initial pressure buildup (B3) in pressure equalization with absorber 3 via conduit 74; for this purpose, with the valve 16 being closed, valves 14 and 34 are opened. After this first pressure equalization, adsorber 1 is subjected to a second pressure equalization via conduit 74 which valve 14 remaining open and valve 34 being closed, whereas valve 44 is open at this point in time, this time with adsorber 4 presently passing through its second cocurrent expansion phase (E2). After termination of this second pressurizing phase (B2), valve 14 is closed and a third pressure equalization is initiated with adsorber 5 via conduit 73 and the opened valves 13 and 53. During this pressurizing phase (B1) of adsorber 1, adsorber 5 is passing through its first cocurrent expansion phase (E1). Finally, adsorber 1 is again brought to adsorption pressure after closing valve 53 with product gas from conduit 71 conducted via valves 76 and 13 to the outlet end of adsorber 1, whereupon the cycle can be repeated.

Each adsorber is operated in an adsorption phase (ADS) during 1/6 of the duration of the cycle. While adsorber 1 passes through its adsorption phase, adsorber 2 is initially in the pressure buildup phase B1 and then in the pressure buildup phase B0, adsorber 3 is initially in the pressure buildup phase B3 and then in the pressure buildup phase B2, adsorber 4 is initially in the countercurrent expansion phase E5 and then in the scavenging phase S, adsorber 5 is in the cocurrent expansion phase E3 and then in the cocurrent expansion phase E4 and, finally, adsorber 6 is initially in the cocurrent expansion phase E1 and then in the cocurrent expansion phase E2.

To provide that each adsorber, during the time period of its entire adsorption phase, discharges a constant quantity of product via conduit 71, product gas is conducted during phase B0 via the opened valve 76 into the adsorber to be respectively pressurized, but in addition valve 76 is also opened as early as during the pressurizing phase B1 taking place in pressure equalization. In this procedure, by means of a conventional regulating device, not shown in the figure, such an amount of product gas is concomitantly branched off via valve 76 for pressure buildup that the product gas stream withdrawn via conduit 71 remains constant. Such conventional regulating devices are flow controllers, e.g. as described in U.S. Pat. No. 3,703,068.

The cycle schedule illustrated in FIG. 3 contains four pressure equalization stages and five cocurrent expansion phases. The selection of four pressure equalization stages is advantageous especially if a high pressure ratio exists between the adsorption pressure and the residual gas pressure, for example a pressure ratio of 15 or more. The way the process is carried out corresponds substantially to that with the cycle scheme as illustrated in FIG. 2, so that only the differences with respect thereto will now be described.

As contrasted to the aforedescribed cycle schedule, in this case the fourth cocurrent expansion phase (E4) is subdivided into two individual steps E41 and E42. Scavenging (S) of the corresponding adsorber here takes place only during the expansion phase E41 whereas the directly previously scavenged adsorber is subjected to a first pressure equalization (B4) during expansion phase E42. With reference to the adsorber 1 of the installation shown in FIG. 1, this means that, during the cocurrent expansion phase E41, expansion gas is conducted into adsorber 6 via the opened valve 15 and conduit 75; for this purpose, valves 65 and 66 are opened so that the residual gas can be withdrawn via conduit 72. After termination of the expansion phase E41, the expansion gas in phase E42 is still conducted via conduit 75 and the opened valves 15 and 65 into adsorber 6, but valve 66 is closed at this point.

The duration of a complete cycle can vary in both cycle schedules within the ranges conventional for pressure swing adsorption processes; typical cycle periods are in the range of several minutes up to about 30 minutes, for example, 24 minutes.

EXAMPLE

In the following description, with reference to a comparative example, the advantages of the process of this invention will be demonstrated with respect to a process having seven adsorbers of which two are simultaneously in adsorption and including three pressure equalizations, as well as with respect to a process with five adsorbers wherein respectively only one adsorber is simultaneously operated in adsorption, and as it has been disclosed in U.S. Pat. No. 3,564,816.

The raw gas in all three cases is a steam reformer gas containing 75 vol-% hydrogen, 5 vol-% carbon monoxide, 5 vol-% methane, and 15 vol-% carbon dioxide. The desired amount of hydrogen product is in all instances 10,000 Nm$^3$/h with a hydrogen purity of 99.999 vol-%. The raw gas pressure is 20 bar, the residual gas pressure is 1.3 bar, and the raw gas temperature is 303 K. The adsorbent is zeolitic molecular sieve.

Using the process of this invention will three pressure equalizations, as illustrated in FIG. 2, a raw gas quantity is required of 15,504 Nm$^3$/h, corresponding to a hydrogen yield of 86%. A comparably high hydrogen yield could heretofore be attained only with the use of process with at least seven adsorbers, requiring a significant extra expenditure in vessels and valves. In contrast, the process with five adsorbers produces a hydrogen yield of only 81%. Whereas the investment costs for the pressure swing adsorption installation are actually lower in this case, the savings are more than counterbalanced by the higher investment costs in connection with the gas generator which must be larger by about 5%, for obtaining the same amount of hydrogen product, than in the case of the process of this invention, as well as by the higher operating expenses.

The essential comparative data relating to the three processes are set forth in the table below.

|  | 6-Adsorber | 7-Adsorber | 5-Adsorber |
| --- | --- | --- | --- |
| Amount of raw gas, Nm$^3$/h | 15,504 | 15,504 | 16,461 |
| H$_2$ Yield, % | 86 | 86 | 81 |
| Relative adsorbent volume of total installation with identical periods for expansion, scavenging, and pressurizing procedures | 100 | 116 | 110 |
| Number of Adsorbers | 6 | 7 | 5 |
| Number of switching valves | 36 | 42 | 30 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process for the purification of a gaseous stream with the use of six adsorbers cyclically operated, wherein the gaseous stream during an adsorption phase at the highest process pressure is conducted through an adsorber, and purified gas is withdrawn from the outlet end of the adsorber, the adsorber being subjected, after termination of the adsorption phase, to a multistage cocurrent expansion, and the resultant expansion gases being utilized, in part, for pressure buildup of other, previously scavenged adsorbers and, in part, for scavenging another adsorber which is at the lowest process pressure, whereafter a countercurrent expansion is performed to the lowest process pressure and scavenging is conducted with cocurrent expansion gas from another adsorber, followed by multistage pressurizing to the adsorption pressure with cocurrent expansion gas and purified product gas, the improvement comprising operating the process with only one adsorber at a time in an adsorption phase, and with four or five cocurrent expansion phases, of which one yields scavenging gas for another adsorber and the remaining expansion gases are conducted in pressure equalization with other adsorbers to be pressurized.

2. A process according to claim 1, further comprising conducting the first three cocurrent expansion phases in pressure equalization with other adsorbers and withdrawing the fourth cocurrent expansion phase gas as scavenging gas.

3. A process according to claim 2, wherein a scavenged adsorber is pressurized to adsorption pressure by the successive steps of introducing cocurrent expansion gas from the third, then the second, and finally the first cocurrent expansion phase from three different adsorbers and finally by product gas.

4. A process according to claim 3, wherein during the final pressure buildup phase conducted in pressure equalization, product gas is likewise conducted into the adsorber to be pressurized, besides the expansion gas from the first cocurrent expansion phase of an adsorber to be expanded.

5. A process according to claim 4 wherein said remaining expansion gases are directly conducted in pressure equalization with adsorbers to be pressurized.

6. A process according to claim 3 wherein said remaining expansion gases are directly conducted in pressure equalization with adsorbers to be pressurized.

7. A process according to claim 2, wherein a scavenged adsorber is pressurized to adsorption pressure by the successive steps of introducing cocurrent expansion gas from the fifth, then the third, second, and finally the first cocurrent expansion phase from four different adsorbers and finally by product gas, the expansion gas of the fifth cocurrent expansion phase being withdrawn from the adsorber that previously, in its fourth cocurrent expansion phase, yielded the scavenging gas for the adsorber to be pressurized.

8. A process according to claim 7, wherein during the final pressure buildup phase conducted in pressure equalization, product gas is likewise conducted into the adsorber to be pressurized, besides the expansion gas from the first cocurrent expansion phase of an adsorber to be expanded.

9. A process according to claim 8 wherein said remaining expansion gases are directly conducted in pressure equalization with adsorbers to be pressurized.

10. A process according to claim 7 wherein said remaining expansion gases are directly conducted in pressure equalization with adsorbers to be pressurized.

11. A process according to claim 2 wherein said remaining expansion gases are directly conducted in pressure equalization with adsorbers to be pressurized.

12. A process according to claim 1, wherein a scavenged adsorber is pressurized to adsorption pressure by the successive steps of introducing cocurrent expansion gas from the third, then the second, and finally the first cocurrent expansion phase from three different adsorbers and finally by product gas.

13. A process according to claim 12, wherein during the final pressure buildup phase conducted in pressure equalization, product gas is likewise conducted into the adsorber to be pressurized, besides the expansion gas from the first cocurrent expansion phase of an adsorber to be expanded.

14. A process according to claim 13 wherein said remaining expansion gases are directly conducted in pressure equalization with adsorbers to be pressurized.

15. A process according to claim 12 wherein said remaining expansion gases are directly conducted in pressure equalization with adsorbers to be pressurized.

16. A process according to claim 1, wherein a scavenged adsorber is pressurized to adsorption pressure by the successive steps of introducing cocurrent expansion gas from the fifth, then the third, second, and finally the first cocurrent expansion phase from four different adsorbers and finally by product gas, the expansion gas of the fifth cocurrent expansion phase being withdrawn from the adsorber that previously, in its fourth cocurrent expansion phase, yielded the scavenging gas for the adsorber to be pressurized.

17. A process according to claim 16, wherein during the final pressure buildup phase conducted in pressure equalization, product gas is likewise conducted into the adsorber to be pressurized, besides the expansion gas from the first cocurrent expansion phase of an adsorber to be expanded.

18. A process according to claim 17 wherein said remaining expansion gases are directly conducted in pressure equalization with adsorbers to be pressurized.

19. A process according to claim 16 wherein said remaining expansion gases are directly conducted in pressure equalization with adsorbers to be pressurized.

20. A process according to claim 1, wherein the gaseous stream is a gas comprising hydrogen and impurities, and the impurities are adsorbed.

21. A process according to claim 20 wherein said remaining expansion gases are directly conducted in pressure equalization with adsorbers to be pressurized.

22. A process according to claim 1 wherein said remaining expansion gases are directly conducted in pressure equalization with adsorbers to be pressurized.

* * * * *